(12) United States Patent
Caplan

(10) Patent No.: US 7,233,430 B2
(45) Date of Patent: Jun. 19, 2007

(54) MULTI-CHANNEL DPSK RECEIVER

(75) Inventor: David O. Caplan, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/022,344

(22) Filed: Dec. 23, 2004

(65) Prior Publication Data

US 2006/0139735 A1    Jun. 29, 2006

Related U.S. Application Data

(60) Provisional application No. 60/639,183, filed on Dec. 23, 2004.

(51) Int. Cl.
  *G02F 2/00* (2006.01)
  *H04B 10/06* (2006.01)
  *G02F 1/00* (2006.01)
  *H01S 3/00* (2006.01)
  *H04B 10/00* (2006.01)
  *H04J 14/00* (2006.01)
  *H04J 14/02* (2006.01)

(52) U.S. Cl. .............. 359/325; 398/2; 398/79; 398/208; 398/209; 398/210; 398/211

(58) Field of Classification Search ............... 359/325; 398/2, 79, 208–211
See application file for complete search history.

(56) References Cited

U.S. PATENT DOCUMENTS 6,396,605 B1    5/2002  Heflinger et al.
7,035,543 B1    4/2006  Hoshida et al.
2004/0258423 A1  12/2004  Winzer
2005/0185968 A1*  8/2005  Dorrer et al. ............... 398/188
2005/0260000 A1* 11/2005  Domagala ................... 398/188

FOREIGN PATENT DOCUMENTS

WO    WO 02/091645 A    11/2002

OTHER PUBLICATIONS

Xu et al, "Differential Phase-Shift Keying for High Spectral Efficiency Optical Transmissions", IEEE Journal of Selected Topics in Quantum Electronics, vol. 10, No. 2, Mar./Apr. 2004, pp. 281-293.*

(Continued)

*Primary Examiner*—Michelle Connelly-Cushwa
*Assistant Examiner*—Rhonda S. Peace
(74) *Attorney, Agent, or Firm*—Hamilton, Brook, Smith & Reynolds, P.C.

(57) ABSTRACT

An optical, multi-channel, Differential Phase Shift Keying (DPSK) receiver demodulates multiple Wavelength Division Multiplexed (WDM) channels using a single interferometer. This distributes expense of the interferometer over all channels of an optical signal, allowing for deployment of cost-effective, scalable, wideband, WDM DPSK systems. For example, for an 80 channel WDM link, the receiver uses a single interferometer instead of eighty interferometers and associated stabilization hardware, dramatically reducing size, weight, power, and cost. The receiver is architecturally compatible with existing interferometer technologies so previous development and qualification efforts can be leveraged. This allows for expedited technology insertion into existing optical communications networks, including terrestrial and space-based optical networks.

49 Claims, 10 Drawing Sheets

OTHER PUBLICATIONS

Xu, Chris, et al., "Differential Phase-Shift Keying for High Spectral Efficiency Optical Transmissions," *IEEE Journal of Selected Topics in Quantum Electronics,* vol. 10, No. 2, 281-293 (Mar./Apr. 2004).

Kim, Hoon, "Cross-Phase-Modulation-Induced Nonlinear Phase Noise in WDM Direct-Detection DPSK Systems," *Journal of Lightwave Technology,* vol. 21, No. 8, 1770-1774 (Aug. 2003).

Rhee, J.K., et al., "DPSK 32×10 Gb/s Transmission Modeling on 5×90 km Terrestrial System," *IEEE Photonics Technology Letters,* vol. 12, No. 12, 1627-1629 (Dec. 2000).

Rohde, M., et al., "Robustness of DPSK Direct Detection Transmission Format in Standard Fibre FDM Systems," *Electronics Letters,* vol. 36, No. 17, 1483-1484, (Aug. 2000).

Spellmeyer, N.W., et al., "High-Sensitivity 40-Gb/s Rz-DPSK With Forward Error Correction," *IEEE Photonics Technology Letters,* vol. 16, No. 6, 1579-1581 (Jun. 2004).

Gnauk, A.H., et al., "Demonstration of 42.7-Gb/s DPSK Receiver with 45 Photons/Bit Sensitivity," *IEEE Photonics Technology Letters,* vol. 15, No. 1, 99-101 (Oct. 2003).

Hung, W., et al., "An Optical Network Unit for WDM Access Networks with Downstream DPSK and Upstream Remodulated OOK Data Using Injection-Locked FP Laser," *IEEE Photonics Technology Letters,* v. 15, No. 10, 1476-1478, (Oct. 2003).

Gnauck, A.H., et al., "25×40-Gb/s Copolarized DPSK Transmission Over 12×100-km NZDF With 50-Ghz Channel Spacing," IEEE Photonics Technology Letters, vol. 15, No. 3, 467-469 (Mar. 2003).

Leng, L., et al., "1.6 Tb/s(40×40 Gb/s) Transmission Over 500 km of Nonzero Dispersion Fiber with 100-km Amplified Spans Compensated by Extra-High-Slope Dispersion-Compensating Fiber," In Proc. OFC 2002 (2002), paper ThX2.

Liu, F., et al., "1.6 Tbits/s (40×42.7 Gbit/s) Transmission Over 3600 km UltraWave™ Fiber with all-Raman Amplified 100 km Terrestrial Spans Using ETDM Transmitter and Receiver," in Proc. OFC 2002, (2002), paper Fc7-1.

Rasmussen C., et al. "DWDM 40G Transmission Over Trans-Pacific Distance (10,000 km) Using CSRZ-DPSK, Enhanced FEC and All-Raman Amplified 100 km UltraWave™ Fiber Spans," in Proc. OCIA 2003 (2003), paper PD18-1.

Vassilieva, O., et al., "Numerical Comparison of NRZ, CS-RZ and IM-DPSK Formats in 43 Gbit/s WDM Transmission," in Proc. LEOS 14th Annual Meeting, (2001), paper ThC2.

Yonenaga, K., et al., "10-Gbit/s × Four-Channel WDM Transmission Experiment Over 2400-km DSF Using Optical DPSK Direct Detection Scheme," in Proc. OFC 97, 331-332. (1997), paper Th52.

Atia, W.A., and Bondurant, R.S., "Demonstration of Return-to-Zero Signaling in Both OOK and DPSK Formats to Improve Receiver Sensitivity in an Optically Preamplified Receiver," in Proc. LOES 12th Annual Meeting, vol. 1, 226-227 (1999), paper TuM3.

Caplan, D.O., et al., "Performance of High-Rate High-Sensitivity Optical Communications with Forward Error Correction Coding," CLEO, CPDD9, May 2004.

Gnauck, A.H., et al., "2.5 Tb/s (64×42.7 Gb/s) Transmission Over 40×100 km NZDSF Using RZ-DPSK Format and All-Raman-Amplified Spans," in Proc. OFC, 2002, paper FC2-1.

Zhu, B., et al., "72-nm Continuous Single-Band Transmission of 3.56 Tb/s (89×42.7 Gb/s) Over 4000 km of NZDF Fiber," in Proc. OFC 2002 (2002).

Grosz, D.F., et al., "5.12 Tb/s (128×42.7 Gb/s) Transmission with 0.8 bit/s/Hz Spectral Efficiency Over 1280 km of Standard Single-Mode Fiber Using All-Raman Amplification and Strong Signal Filtering," in Proc. ECOC 2002, Postdeadline paer PD4.3, (2002).

Charlet, G., et al., "6.4 Tb/s (159×42.7 Pg/s) Capacity Over 21×100 km Using Bandwidth-Limited Phase-Shaped Binary Transmission," in Proc. ECOC 2002, Postdeadline Paper PD4.1 (2002).

Zhu, B., et al., "Transmission of 3.2 Tb/s (80×42.7 Gb/s) Over 5200 km of UltraWave™ Fiber with 100-km Dispersion-Managed Spans Using RZ-DPSK Format," in Proc. ECOC 2002, Postdeadline Paper PD4.2, (2002).

Swanson, E.A., et al., "High Sensitivity Optically Preamplified Direct Detection DPSK Receiver with Active Delay-Line Stabilization," IEEE Photonics Technology Letters, vol. 6, No. 2 263-265 (Feb. 1994).

Miyamoto, Y., et al., "S-band WDM coherent transmission of 40×43-Gbit/s CS-RZ DPSK signals over 400 km DSF using hybrid GS-TDFAs/Raman amplifiers," *Electronics Letters,* 38(24): 1569-1570 (2002).

Yonenaga, K., et al., "Reduction of four-wave mixing induced penalty in unequally spaced WDM transmission system by using optical DPSK," *Electronics Letters,* 32(23): 2118-2119 (1996).

Liu, Xiang, et al., "Athermal Optical Demodulator for OC-768 DPSK and RZ-DPSK Signals," *IEEE Phtonics Technology Letters,* 17(12) 2610-2612 (2005).

Gnauck, A.H. and Winzer, P.J., "Optical phase-shift-keyed transmission," *J. Lightw. Technol.* 23(1) 115-130, (2005).

Hsieh, Y.C., et al., "Athermal Demodulator for 42.7-Gb/s DPSK Signals," in ECOC 2005 Proceedings-vol. 4., Glasgow, U.K., 2005, Paper Th 1.5.6.

Gnauck, A.H., et al., "Optical Duobinary Format From Demodulation of DPSK Using Athermal Delay Interferometer," *IEEE Photonics Tech. Lett.,* 18(4) 637-639 (2006).

* cited by examiner

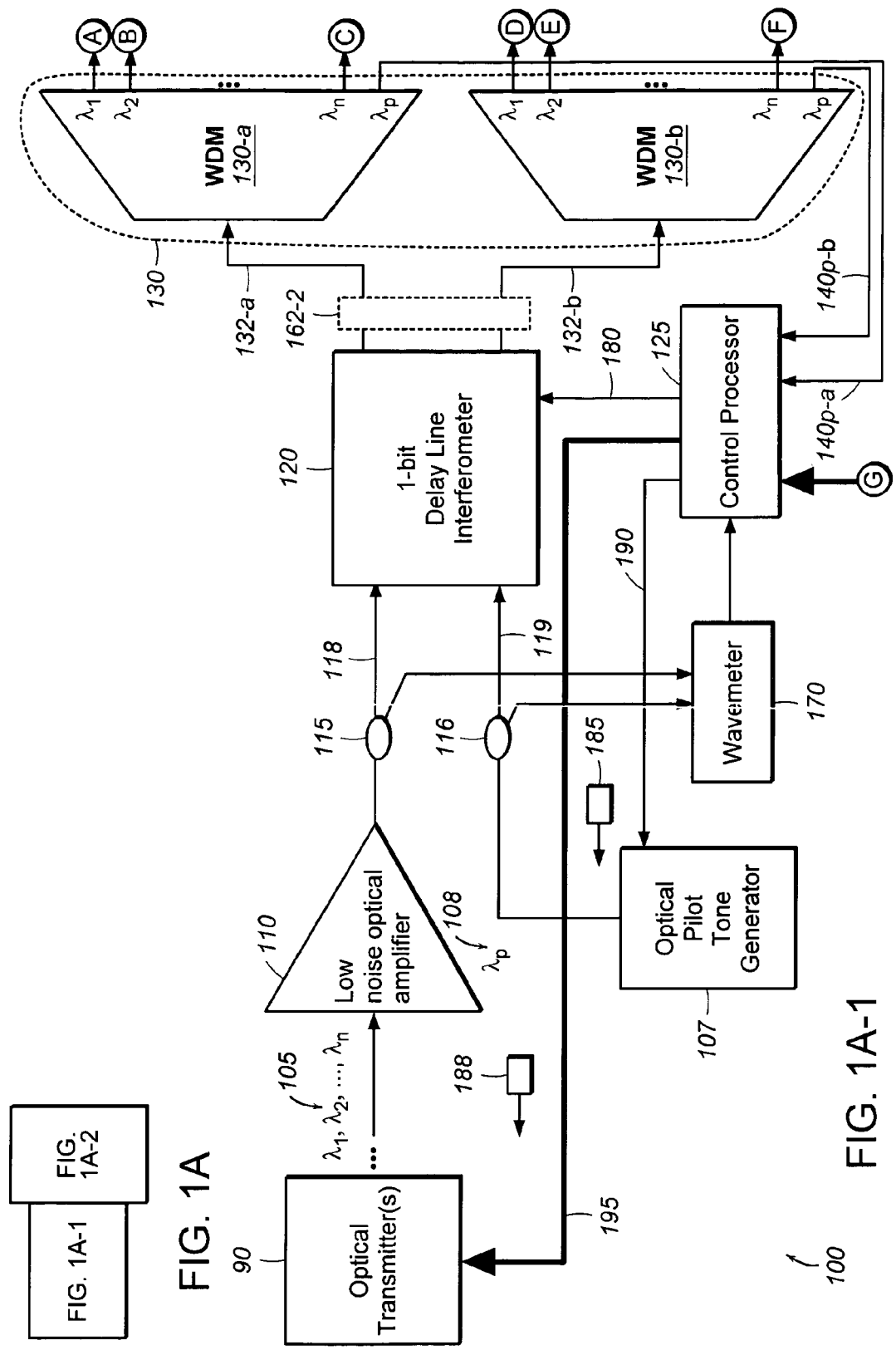

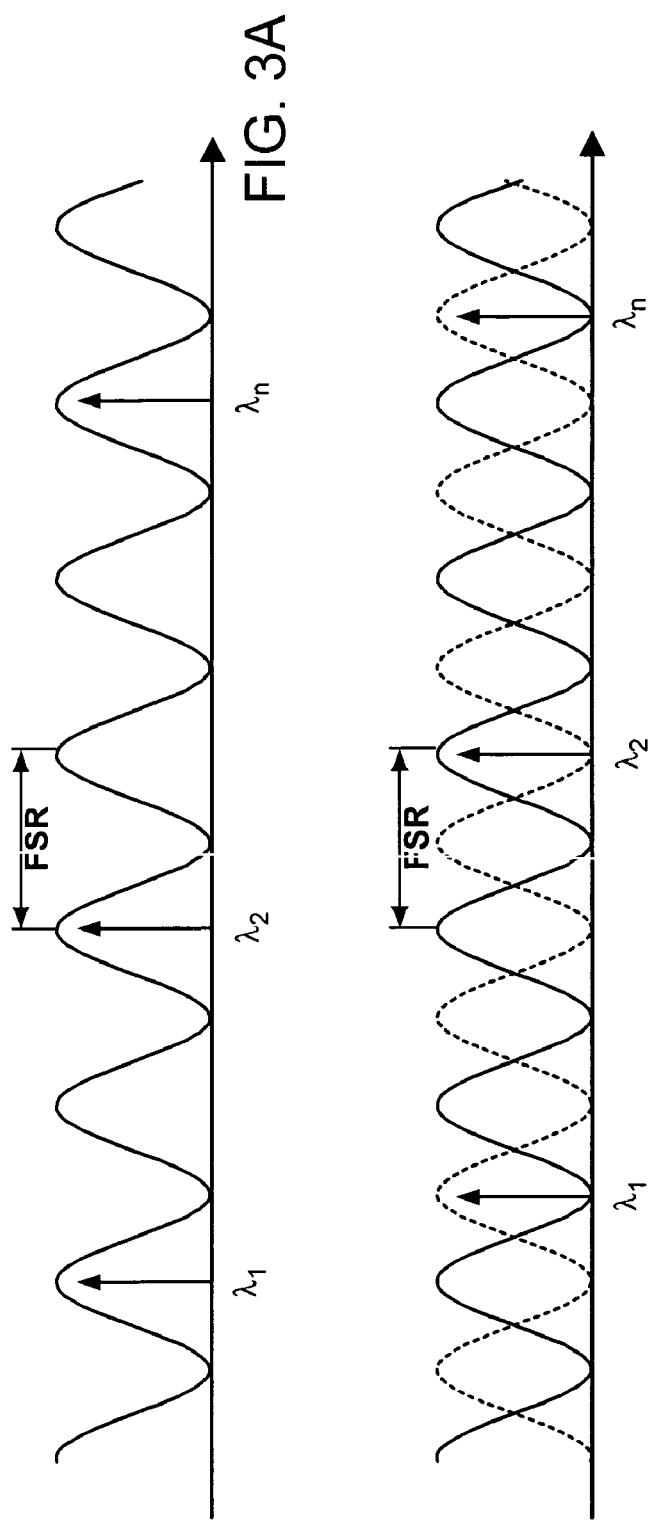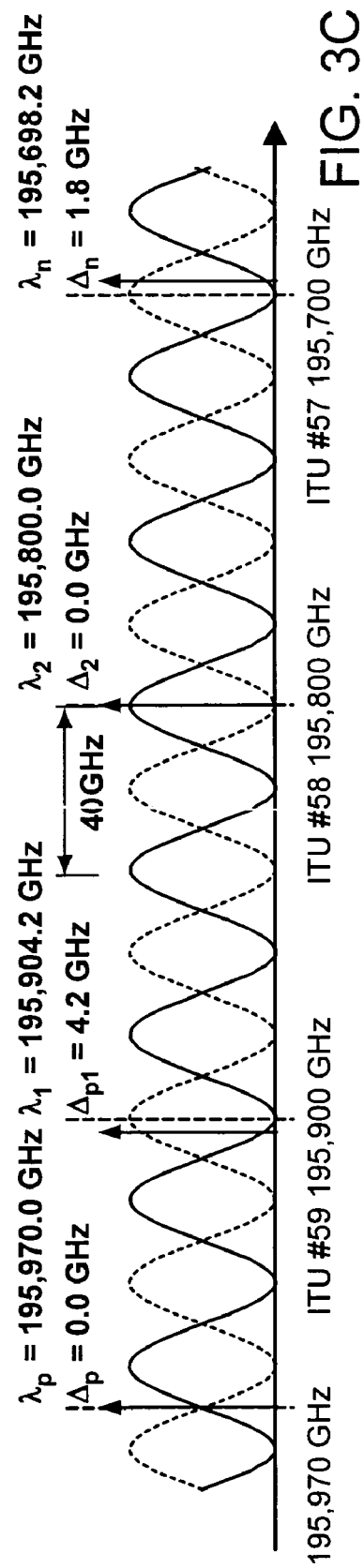

MULTI-CHANNEL DPSK RECEIVER

RELATED APPLICATION(S)

This application claims the benefit of U.S. Provisional Application, "Polarization Independent Interferometers", 60/639,183 filed Dec. 23, 2004 concurrently herewith. The entire teachings of the above application(s) are incorporated herein by reference.

GOVERNMENT SUPPORT

The invention was supported, in whole or in part, by a grant under Contract No. F19628-00-C-0002 from the United States Air Force. The Government has certain rights in the invention.

BACKGROUND OF THE INVENTION

Recently, optical Differential Phase Shift Keying (DPSK) modulation has received considerable attention by the telecommunications industry primarily due to its increased sensitivity over commonly used On-Off-Keying (OOK) and its reduced peak power, which mitigates nonlinear effects in fiber-optic applications. This has led to demonstrated utility in long haul applications, with experiments confirming more than 3 Tb/s capacity using 80 Wavelength Division Multiplexed (WDM) DPSK channels. It is expected that the first wideband telecommunications fiber optic links using WDM DPSK will be deployed by 2006. DPSK is also an attractive modulation format for high-rate spectrally efficient Free Space Optical (FSO) links because the increase in sensitivity over OOK allows for a corresponding reduction in costly transmitter power.

The benefits of optical DPSK come at the cost of increased complexity, requiring a phase modulator in the transmitter and an optical interferometer and balanced detection in the receiver in order to derive maximum benefit. Of these elements, the interferometer is the most technically challenging and the least mature. Control hardware is necessary to ensure stable operation, which requires that the arms of the interferometer be stable to small fractions of a wavelength. As a result, carefully designed thermo-mechanical packaging is necessary in addition to stabilization electronics, adding to size, weight, power, and cost.

SUMMARY OF THE INVENTION

An optical, multi-channel, Differential Phase Shift Keying (DPSK) receiver, and corresponding method, employing the principles of the present invention demodulates multiple Wavelength Division Multiplexed (WDM) channels using a single interferometer. A DPSK receiver using a single interferometer for WDM demultiplexing is achieved by constraining the received wavelength spacing ($\Delta v_{ch}$) and leveraging the interferometer's periodic transfer function to perform demodulation on all channels ($\lambda$'s). This distributes the expense of the interferometer over all channels, allowing for deployment of cost-effective, scalable, wideband, WDM DPSK systems. For example, for an 80 channel receiver, size, weight, and power (SWAP), and costs are significantly reduced through use of a single interferometer instead of eighty interferometers and associated stabilization electronics. The receiver is architecturally compatible with existing interferometer technologies, so previous development and qualification efforts can be leveraged. Such leveraging allows for expedited technology insertion into existing optical communications networks, including terrestrial and space-based optical networks.

Accordingly, one embodiment of an optical receiver or corresponding method for demodulating optical signal(s) having DPSK channels according to the principles of the present invention includes a delay line interferometer that (i) demodulates optical signal(s) having DPSK channels to optical signal(s) having channels modulated in intensity, and (ii) outputs the demodulated optical signal(s) onto at least one main output optical path. The receiver also includes channel selectors, such as optical filters or Wavelength Division de-Multiplexers (WDMs), in the main output optical path(s) directing channels onto tributary optical paths. The channels may be predefined wavelengths or wavelength ranges (e.g, 1557.0 nm+/−2.0 nm). The receiver may include optoelectronic converters in the tributary optical paths that convert the demodulated optical signal into respective, corresponding, electrical signals.

The delay line interferometer may be a one-bit delay line interferometer, a multiple bit delay line interferometer, or selectably adjustable delay line interferometer to interfere optical signal pulses offset by selectable numbers. The interferometer may also include an electronically tunable phase shifter for stabilization and/or for receiving channels of different wavelengths.

The interferometer may be adapted to demodulate optical signals having wavelength spacing between carrier wavelengths defining the channels with an integer multiple of a channel rate. For example, for wavelengths on a 100 GHz International Telecommunications Union (ITU) grid (i.e., 100 GHz channel separation), standard Synchronous Optical Network (SONET) rates of 2.5 Gbps and 10 Gbps, for instance, factor evenly into the 100 GHz spacing. Therefore, these rates are compatible with this multi-wavelength DPSK receiver design. In another example, 40 Gbps channel rates requires 200 GHz channel spacing, which is also compatible with the ITU grid and the multi-wavelength DPSK receiver.

The interferometer may also be adapted to demodulate optical signals having wavelength spacing between carrier wavelengths defining the channels evenly divisible by an odd number of half channel rates of the optical signal. For example, 40 Gbps goes into 100 GHz channel spacing exactly 2½ times. The received Signal-to-Noise Ratio (SNR) remains intact, but the received data is inverted—a condition that can be anticipated or detected and corrected via post processing. In one embodiment, detection electronics perform the post processing by correcting polarity of electrical signals of received optical channels as necessary, which may correspond to predefined optical channels. In another embodiment, optical elements perform the post processing by correcting polarity of the phase demodulated optical signal. With this capability, a multi-wavelength DPSK receiver can receive all channels without any penalty whenever the channel spacing is evenly divisible by the half channel rate.

For prior art, single channel, DPSK receivers, the interferometer may track on the single carrier wavelength to optimize demodulator performance and compensate for transmitter or interferometer drift. However, for multiple-channel reception with a single interferometer, the interferometer can only adjust the period (i.e., wavelength or channel separation) and/or shift the entire comb of channels. Thus, a single interferometer cannot track and lock onto arbitrarily spaced wavelengths simultaneously in order to optimize performance. Therefore, the optical receiver according to the principles of the present invention may also include a feedback processor that generates signals transmitted to transmitter(s) of the optical signal(s) to cause the transmitter(s) to tune carrier wavelengths defining the channels. Tuning the carrier wavelengths allows for independent channel adjustment and alignment to the interferometer for improved demodulation performance. With this feedback, independent transmitter wavelengths can be precisely aligned to the interferometer, despite potential drift in the transmitter wavelengths relative to the interferometer. Such feedback, for example, could be used to compensate for laser aging or for Doppler shifts.

In one embodiment, the optical receiver includes a low noise optical amplifier that receives the optical signal(s) and outputs the received, amplified, optical signal(s) to the interferometer, where "optical signal(s)" in this case refers to the collection of one or more WDM channels being received. The low noise optical amplifier may be an Erbium Doped Fiber Amplifier (EDFA) or other optical amplifier known in the art.

To support interferometer control, the interferometer may receive a pilot signal or plurality of pilot signals that serve(s) as reference wavelengths that the interferometer can lock-on to for stabilization and/or alignment to incoming optical signal(s). The pilot signal(s) may be locally resident or distributed, may be tunable, and may be selected to be outside the standard communications band so as not to impact the available communications spectrum. As an example, the pilot tone to which the interferometer locks-on can be a dominant incoming channel that may be selectable by the network. With feedback, the interferometer and all other channels including locally resident references can be spaced at wavelengths relative to the dominant signal. In the event the dominant channel drops out, locally resident pilot tone(s) or other incoming channels, which have been aligned relative to the dominant channel can take over as the reference, allowing for continued wavelength alignment and control. The use of multiple pilot tones can be used to improve interferometer control and provide a means of measuring interferometer parameters, such as Free Spectral Range (FSR).

The receiver may be used in various applications, such as an optical regenerator. The receiver may also be used in various optical networking environments, such as Free Space Optic (FSO) and fiber optic environments. Within those environments, the networks may be point-to-point networks, mesh networks, ring networks, broadcast networks, multi-access networks, and so forth.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a spectral diagram indicating channel wavelength spacing as an integer multiple of a channel rate that optimizes use of one embodiment of the receiver of FIG. 1A or 1B;

FIG. 3B is a spectral diagram indicating channel wavelength spacing as an integer multiple of a half channel rate that optimizes use of an alternative embodiment of the receiver of FIG. 1A or 1B;

FIG. 3C is a spectral diagram indicating targeted wavelength spacing on the ITU grid that optimizes use of an alternative embodiment of the receiver of FIG. 1A or 1B, illustrating the use of a pilot tone to lock the interferometer to a known reference and wavelength measurement to generate corrective feedback to transmitters of a DPSK optical signal;

DETAILED DESCRIPTION OF THE INVENTION

A description of preferred embodiments of the invention follows.

Figures 1, 1A, 2:
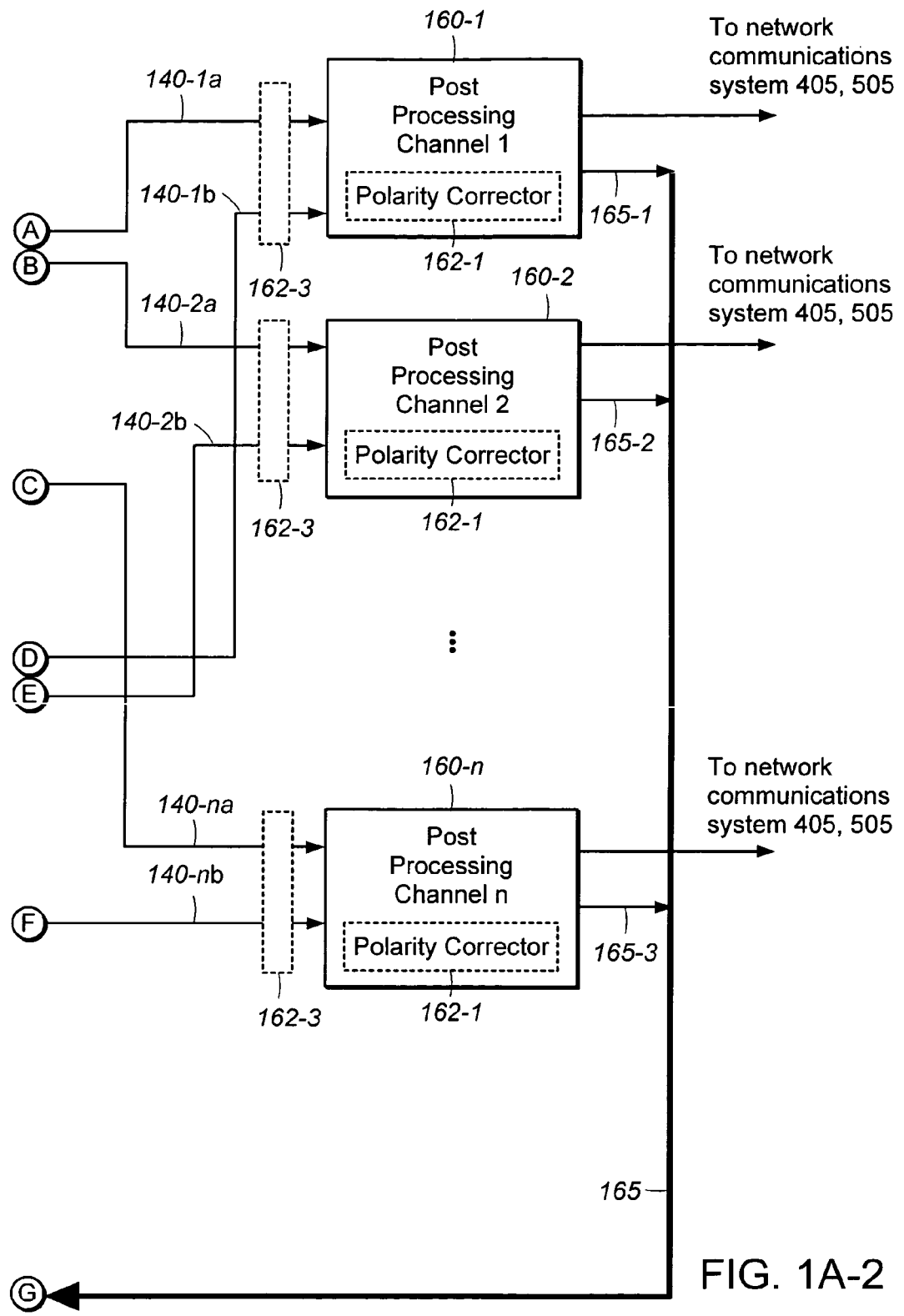
FIGS. 1A and 1B are a schematic diagrams of an optical, multi-channel, Differential Phase Shift Keying (DPSK) receiver according to the principles of the present invention.
Figures 1, 1B:
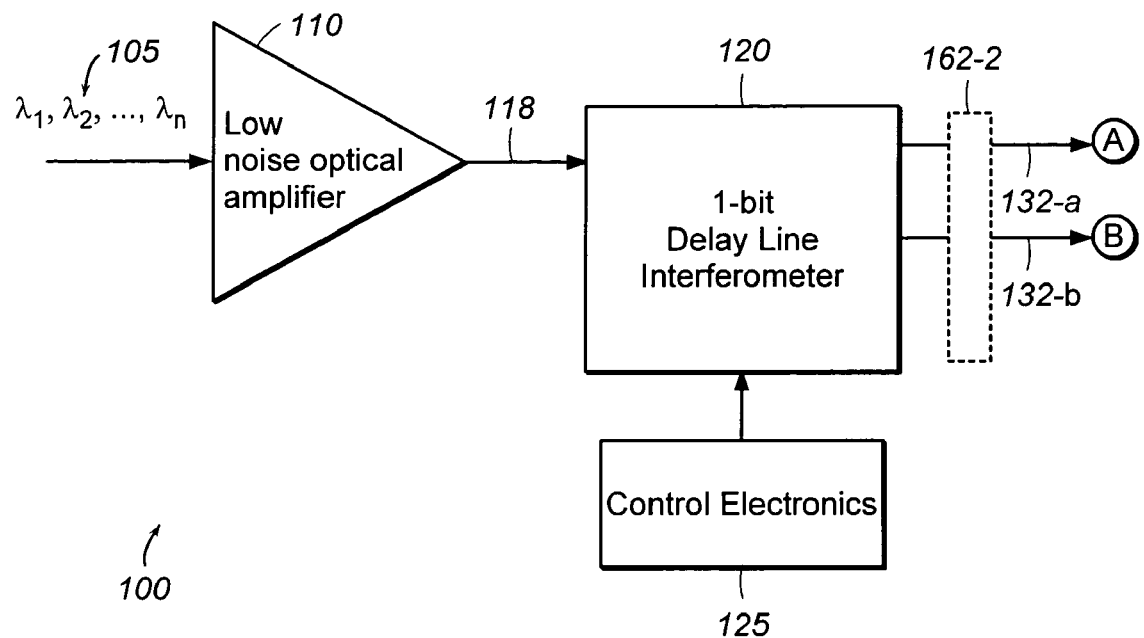
Figure 1B:
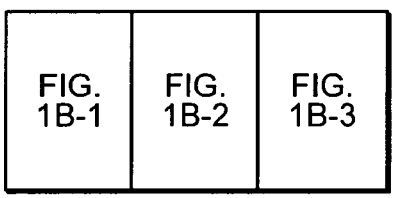
Figures 1, 1B, 2:
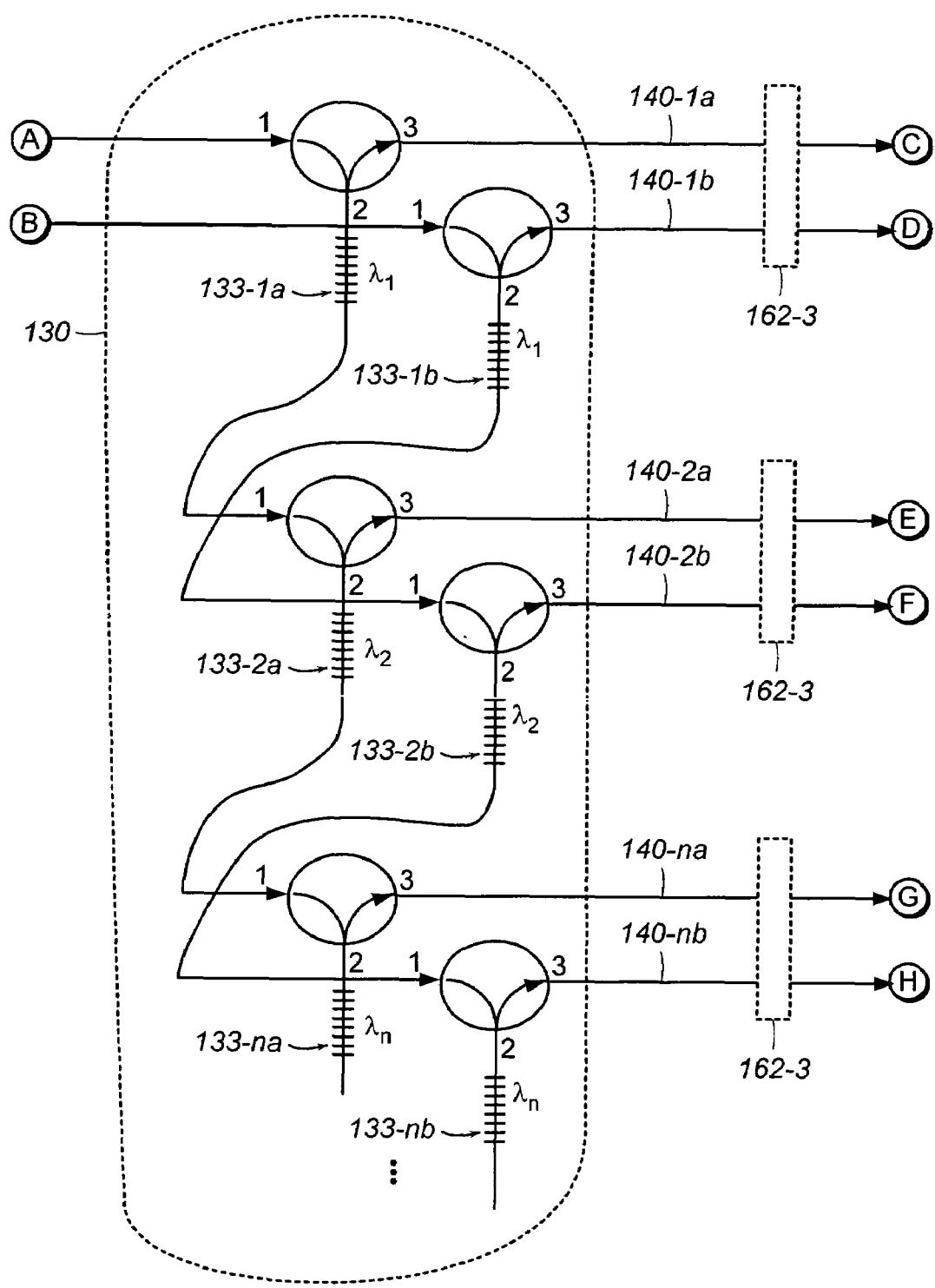

FIG. 1A and FIG. 1B are schematic diagrams of example embodiments of an optical, multi-channel, DPSK receiver 100 according to the principles of the present invention. The receiver 100 receives optical signal(s) 105 from optical transmitter(s) 90. The optical signal(s) 105 may have many DPSK channels defined by distinct wavelengths, $\lambda_1, \lambda_2, \ldots, \lambda_n$. In one embodiment, the optical signal(s) 105 are received by an optical amplifier 110, such as a low noise Erbium Doped Fiber Amplifier (EDFA) 110, that may be separate from the receiver 100 or integrated into the receiver 100. The EDFA 110 outputs amplified optical signal(s) 105 to a first optical splitter 115, which directs a portion of the amplified optical signal(s) 105 to an interferometer 120, such as a 1-bit delay line interferometer 120, via a primary input line 118. The delay line interferometer 120 is sometimes referred to as a "delay and multiply demodulator." The remaining portion of the amplified optical signal(s) 105 is directed to a wavemeter 170. The receiver 100 may leverage the periodic transfer functions ($\cos^2$ or $\sin^2$) from either arm of the interferometer 120 to perform a delay line (e.g., one bit) demodulation on all channels ($\lambda$'s) with a single interferometer. Such leveraging is preferably performed by defining the wavelength spacing ($\Delta v_{ch}$) to be an integer multiple of a channel rate (R).

$\Delta v_{ch}$=mR, where m is a positive integer. (Equation 1)

The interferometer 120 demodulates the optical signal(s) 105 by interfering the received optical signal pulses from each channel with an offset version of itself, where the offset is equal to the interferometer delay. The delay is usually a one bit delay (i.e., interfering adjacent signal pulses), but more generally can be an integer multiple of the one bit delay duration (i.e., interfering non-adjacent pulses). The interference converts the optical signal in each channel from being differentially phase modulated to being intensity modulated. An example of an interferometer that may be used in the receiver 100 is described below in reference to FIG. 2A.

Continuing to refer to FIG. 1, the interferometer 120 outputs a processed form of the optical signal(s) 105 onto first and second main optical paths 132-*a* and 132-*b*, respectively (collectively, optical paths 132). The demodulated optical signal(s) on the two main optical paths 132 are complementary; if the optical signal pulses in each channel constructively interfere (i.e., they are in-phase), the interferometer 120 directs the phase demodulated optical signals onto one main optical path (132-*a*), and if the optical signal pulses destructively interfere (i.e., they are out-of-phase), the interferometer 120 directs the phase demodulated optical signal onto the other main optical path (132-*b*).

The optical paths 132 traverse a channel selector network 130 shown as 1×(n+1) Wavelength Division de-Multiplexers (WDMs) 131-*a*, 131-*b* (collectively 131) (e.g., prisms, diffraction gratings, or Arrayed Waveguide Gratings (AWGs) in FIG. 1A, and alternatively defined by a series of cascaded fiber Bragg grating (FBG) WDM filter pairs 133-1*a*/133-1*b*, 133-2*a*/133-2*b*, . . . , 133-*na*/133-*nb* (collectively, WDM filters 133) in FIG. 1B. The WDMs 131 (FIG. 1A) or filter pairs 133 (FIG. 1B) is/are coupled to respective tributary optical paths 140-1*a*/140-1*b*, 140-2*a*/140-2*b*, . . . , 140-*na*/140-*nb*(collectively, tributary optical paths 140).

Figure 4:
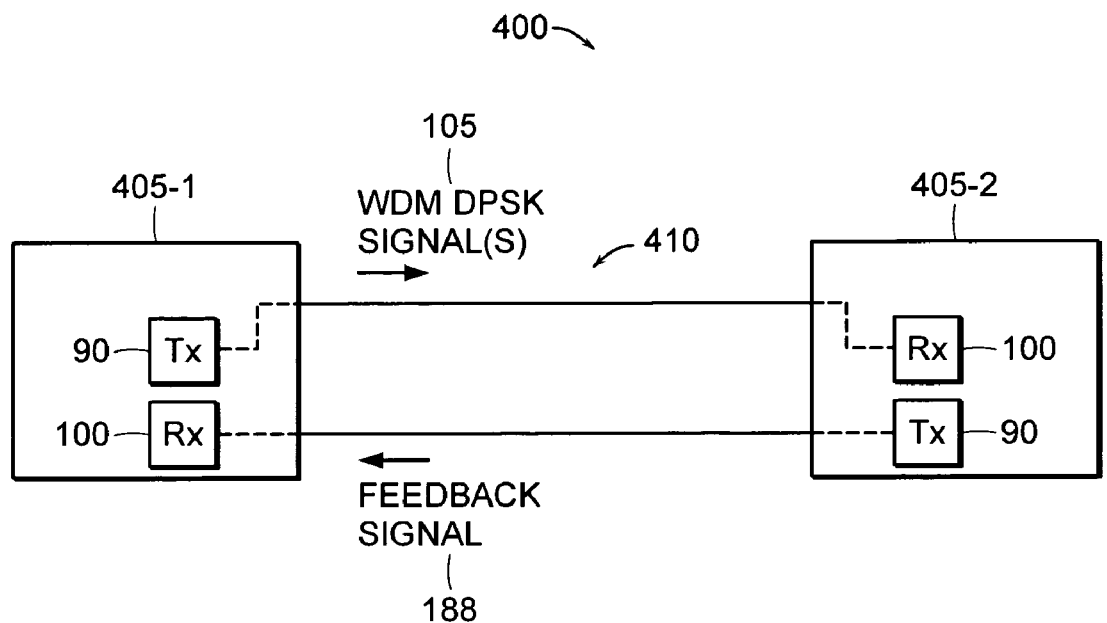
FIG. 4 is a schematic diagram of network nodes employing the receiver of FIG. 1A or 1B.
Figure 5B:
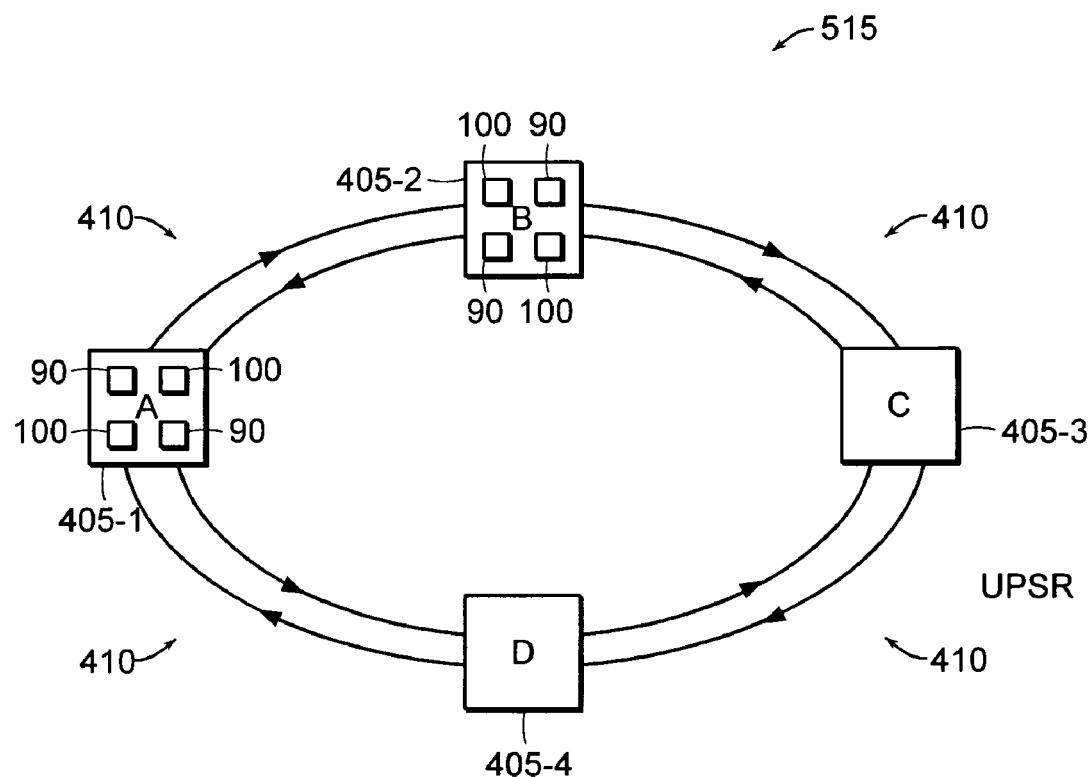
FIG. 5B is a network diagram of an optical communications network application in which the receiver of FIG. 1A or 1B is deployed in network nodes.
Figure 5A:
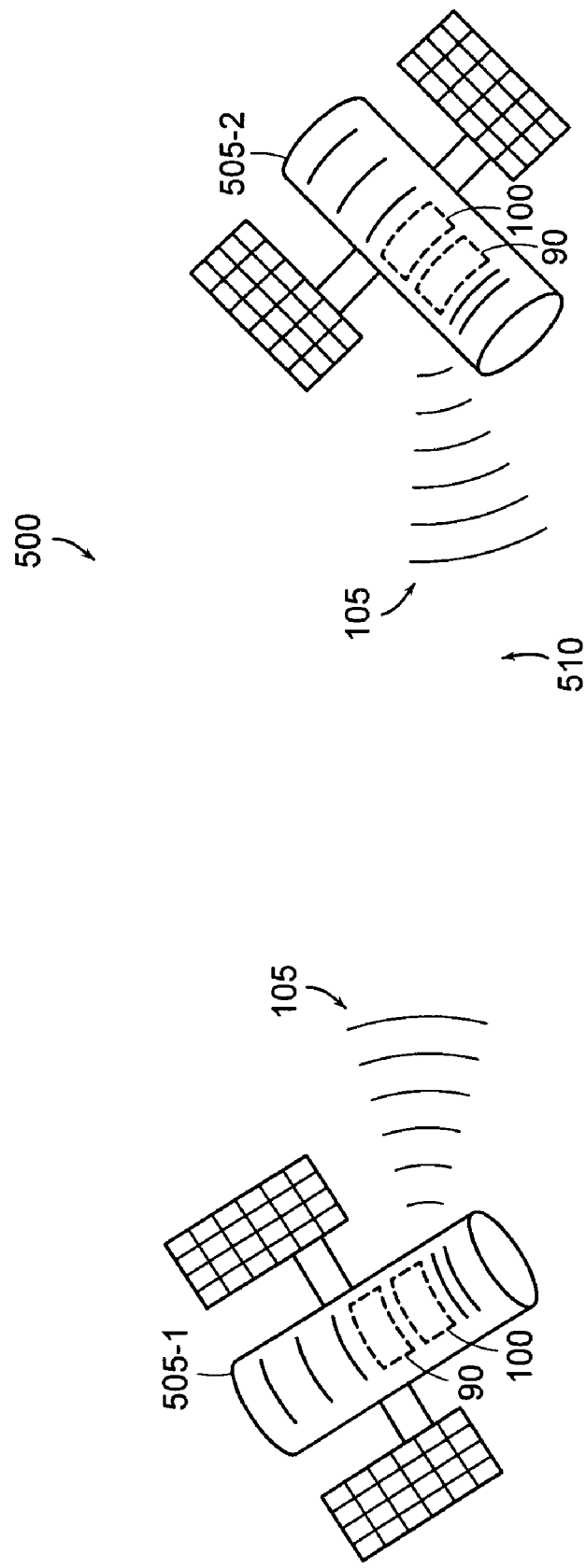
FIG. 5A is an illustration of a Free Space Optic (FSO) application in which the receiver of FIG. 1A or 1B is deployed in mobile platforms such as satellites or aircraft.

The tributary paths for each channel are sent to post processing elements 160, which may be all optical, or optoelectronic, which includes elements such as communications electronics (not shown), balanced detection hardware 150, and detection electronics 155, as illustrated in FIG. 1B. The communications electronics pass network traffic to network communications systems (FIGS. 4, 5A, and 5B). The detection electronics 155 may include peak RF power detection (for signal-to-interferometer alignment), clock recovery, Forward Error Correction (FEC) decoding hardware, and so forth. As shown in FIG. 1A, each of the post processing elements 160-1, 160-2, . . . 160-*n*, (collectively 160) may send channel performance information or metrics, such as Bit Error Rate (BER) and peak RF power, to a control processor 125 via bus lines 165-1, 165-2, . . . , 165-*n* (collectively 165). Other inputs to the control processor 125 may include measurements by a wavemeter 170 of a pilot tone 108 and incoming optical signal(s) wavelength information, which can be used along with the BER and peak RF power, among other information or metrics, to determine feedback signal(s) 185 and 188. The feedback signals 185 and 188 are communicated from the control processor 125 to the pilot tone generator 107 and optical transmitter(s) 90 via feedback paths 190 and 195, respectively. The feedback signals 185 and 188 are generated to control the pilot tone 108 and incoming received signal wavelengths, respectively.

For control purposes, an optical pilot tone generator 107 generates an optical pilot or reference tone 108 at wavelength $\lambda_p$ that may be injected into the interferometer 120 via a secondary input line 119 at an output of a second optical splitter 116. A portion of the pilot tone 108 may also be directed via the optical splitter 116 to the wavemeter 170 for wavelength measurement. Pilot tone outputs from the interferometer 120 are directed through the channel selector network 130. The a-side and b-side WDM pilot tone outputs on tributary optical paths 140*p*-*a* and 140*p*-*b*, respectively (collectively 140*p*), are directed to a control processor 125, which may measure a contrast between the pilot tone outputs on tributary optical paths 140*p*. The measured contrast (D), which is the normalized difference between the pilot tone outputs on the tributary optical paths 140*p*:

$$D=(140p\text{-}a-140p\text{-}b)/(140p\text{-}a+140p\text{-}b),$$

is a function of the pilot tone wavelength $\lambda_p$ (or equivalently center frequency) and the interferometer bias (e.g., interferometer phase), which is discussed in further detail below in reference to FIGS. 2A and 2B. For a given pilot tone wavelength, which may either be known or measured, the pilot tone contrast ratio is a function of the interferometer bias. Therefore, sending pilot tone outputs on the tributary optical paths 140*p* to the control processor 125 enables the pilot contrast to be determined, which can provide feedback parameters that may be used to measure and the control interferometer 120, as discussed above.

Referring to FIG. 1B, each of the tributary optical paths 140 undergo balanced detection by balanced detectors 150, the output of which is electrically coupled to detection electronics 155-1, 155-2, . . . , 155-*n* (collectively 155). Balanced detection can be accomplished in many ways, for example, using balanced detector pairs that output a difference photocurrent directly or using discrete photodetectors that output their respective photocurrents to electronic elements, such as a differential amplifier, which subsequently performs the differencing. For wavelengths on the International Telecommunications Union (ITU) grid (e.g., 100 GHz channel separation), Time Division Multiplexed (TDM) architecture standard Synchronous Optical Network (SONET) rates of 2.5 Gbps and 10 Gbps, for instance, factor evenly into the 100 GHz ITU spacing. Therefore, these standard rates and wavelength spacing are compatible with this multi-wavelength DPSK receiver design. In another example, 40 Gbps channel rates requires 200 GHz channel spacing, which is also compatible with the interferometer 120 in the optical receiver 100 and the ITU grid.

Figures 1, 1B, 2, 3:
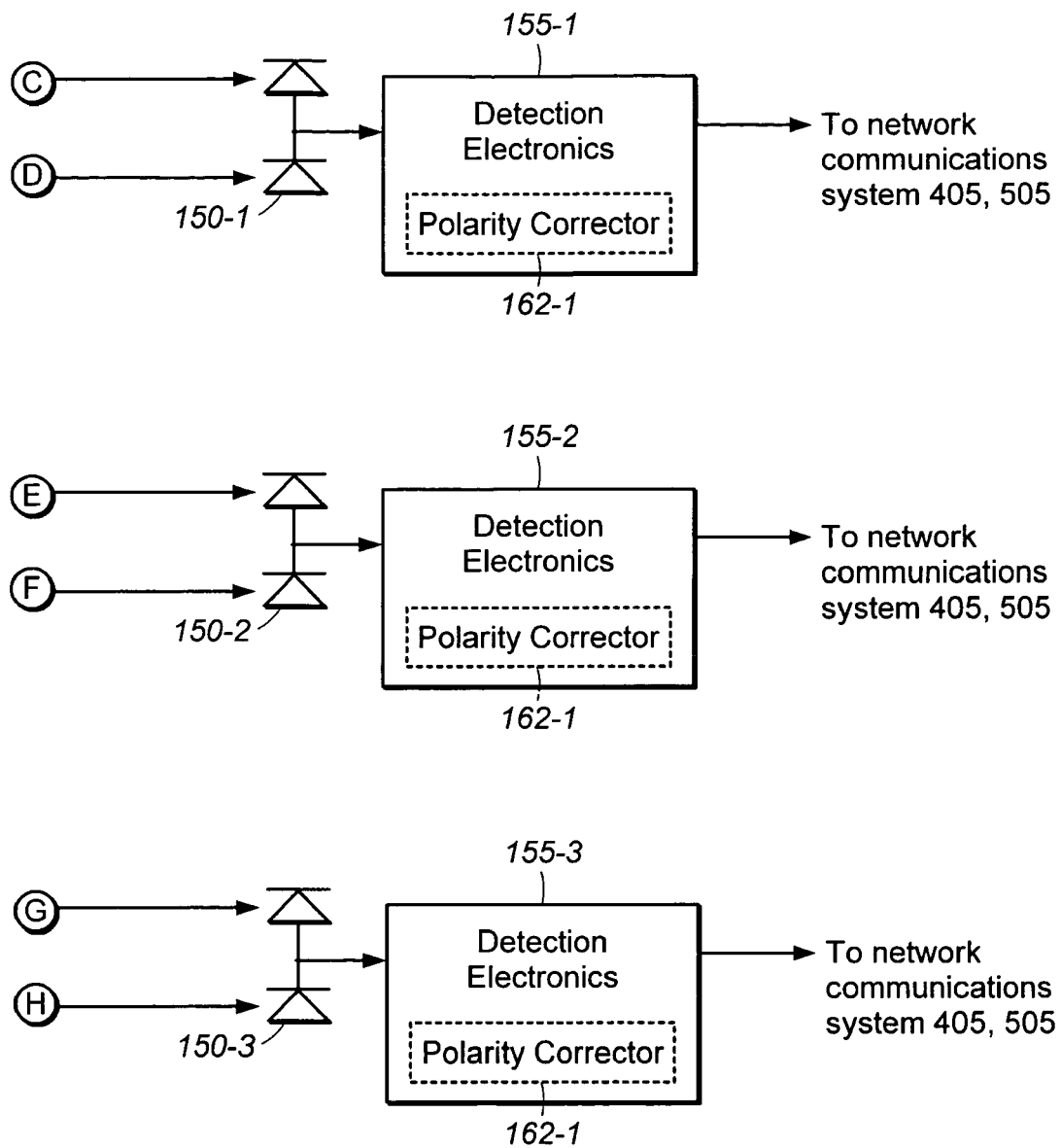

If, however, the channel spacing is evenly divisible by an odd number of half channel rates, for example, 40 Gbps goes into 100 GHz channel spacing exactly 2½ times, the received Signal-to-Noise Ratio (SNR) remains intact, but the received data is inverted on every other channel (see also FIG. 3)—a condition that can be anticipated or detected and corrected via a polarity corrector 162-1 (e.g., a conditional inverter) in the post processing electronics 160 or optically inverted prior to detection by suitable optical element(s) 162-2, 162-3. An example of such an optical element is a controllable delay line interferometer in which the relative optical phase between the two arms can be switched by approximately a half-wavelength of the carrier frequency, or odd multiples thereof. The interferometer 120, for instance, could act as an optical DPSK inverter in this manner, but since it is processing all channels simultaneously, it cannot perform polarity correction selectively. With polarity correction capability, a multi-wavelength DPSK receiver can receive all channels without any penalty whenever the channel spacing is evenly divisible by the half channel rate (R/2), shown in the equation below.

$$\Delta v_{ch}=mR/2, \text{ with polarity correction (m is a positive integer).} \quad \text{(Equation 2)}$$

Figure 2A:
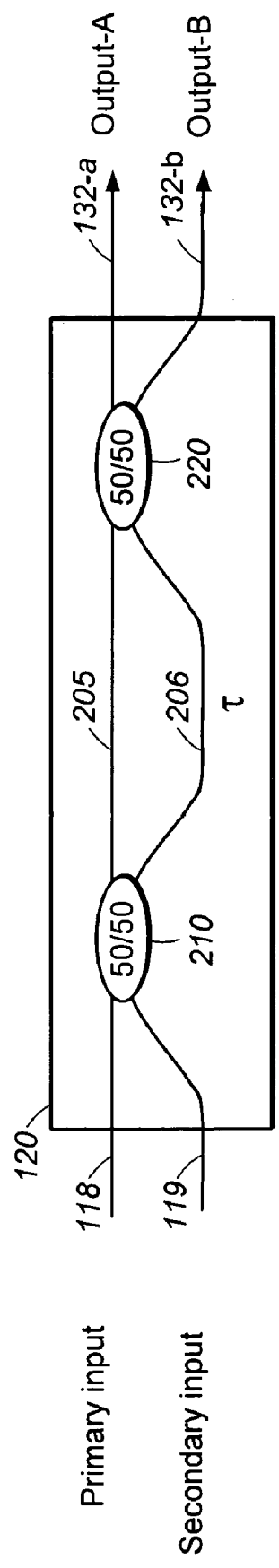
FIG. 2A is a schematic diagram of an example optical delay line interferometer that may be used in the receiver of FIGS. 1A or 1B.

FIG. 2A is a schematic diagram of a representative delay line interferometer 120 composed of a first 50% optical splitter 210 that accepts primary and secondary inputs 118, 119 and splits them equally between two internal paths or "arms" 205, 206 with relative time delay τ. The optical signals in the two paths 205, 206 are recombined with a second 50% optical splitter 220. The interferometer 120 (i) may be constructed as a Mach-Zehnder (as shown) or Michelson interferometer, (ii) may be waveguide, free-space, or fiber based, and/or (iii) may include Faraday rotator elements to achieve polarization independence.

Figure 2B:
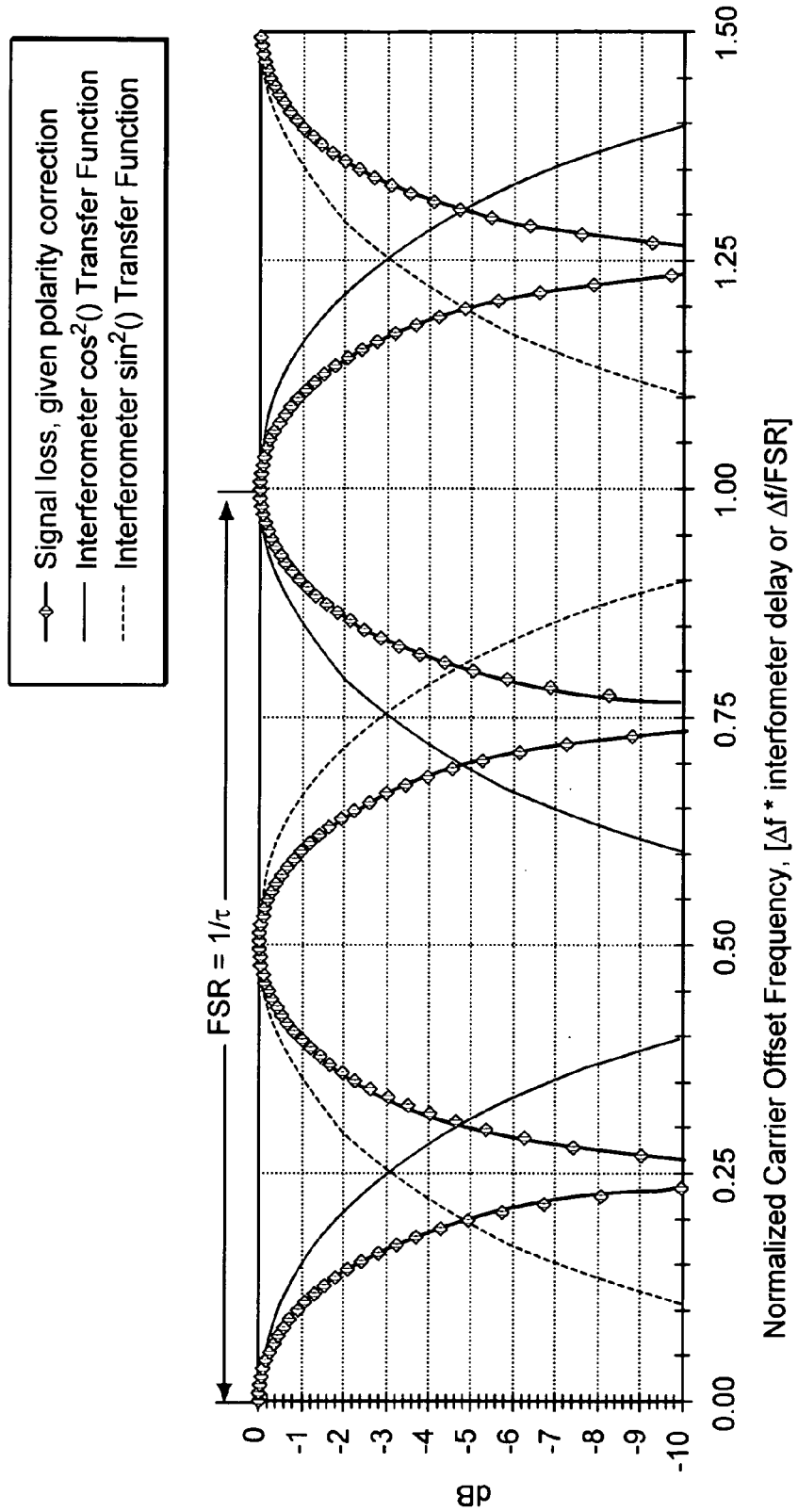
FIG. 2B is a plot of sensitivity as a function of normalized carrier frequency offset (e.g., center wavelength) for the interferometer of FIG. 2A and receiver of FIG. 1A or 1B.

FIG. 2B graphically illustrates signal loss for wavelength misalignment (i.e., the carrier wavelength is offset from the optimum wavelength) given polarity correction. The transfer functions of the two interferometer output arms 132a, 132b are periodic and complementary, following a $\cos^2(\pi(\Delta f + \Delta\phi)/\text{FSR})$ and $\sin^2(\pi(\Delta f + \Delta\phi)/\text{FSR})$ dependence, respectively. The biasing term $\Delta\phi$ is a measure of the relative optical phase between the internal interferometer arms and is typically controlled to maximize the signal interference in one or both of the output arms 132a, 132b. When the bias $\Delta\phi=0$, the term $\Delta f$ is the frequency deviation from optimum alignment of the incoming signal to the interferometer, which is periodic. FSR is the interferometer Free Spectral Range, which is the interferometer spectral period, the inverse of the interferometer time delay ($\tau$).

The theoretical contrast between the two output arms 132a, 132b is calculated according to the following equation: $D=\cos^2(\pi(\Delta f+\Delta\phi)/\text{FSR})-\sin^2(\pi(\Delta f+\Delta\phi)/\text{FSR})=\cos(2\pi\Delta f/\text{FSR})$. The signal-to-noise ratio (SNR) of the interferometer 120 output is dependent on the contrast. When the bias $\Delta\phi=0$, the contrast and SNR go to zero when $\Delta f=\text{FSR}/4$ (or odd multiples thereof), corresponding to the 3 dB point of the transfer function of both arms. Beyond this point, the data starts to invert.

The signal loss is represented as the solid line with diamonds; the solid line represents the interferometer $\cos^2(\ )$ transfer function; the dashed line represents the interferometer $\sin^2(\ )$ transfer function. A performance penalty is incurred with the multi-channel DPSK receiver 100 whenever the condition of Equation 2 presented above is not met since it is not possible for all channels to align to the interferometer simultaneously. This can occur, for example, when commonly used 7%—overhead G.709 compliant Forward Error Correction (FEC) coding is used with standard SONET rates, which brings a 10 Gbps SONET data rate to a 10.7 Gbps coded channel rate. These rates do not factor evenly into the 100 GHz ITU grid spacing, so it is impossible for all of the ITU grid-based WDM channels to align with the periodicity of the interferometer 120.

FIG. 3A is a graphical representation of a channel spacing evenly divisible by an integer multiple of a channel rate, superimposed on the interferometer transfer function for one output arm, (e.g., $\cos^2$). In this case, $\lambda_1$, $\lambda_2$, and $\lambda_n$ are spaced by integer multiples of the channel rate.

FIG. 3B is a graphical representation of a channel spacing evenly divisible by the half channel rate, superimposed on the interferometer transfer function for both output arms, (i.e., $\cos^2$ and $\sin^2$). In this case, $\lambda_1$, and $\lambda_n$ are at an odd half channel rate spacing multiple (requiring polarity correction), and $\lambda_2$ is spaced by both integer and half rate multiples of the channel rate.

FIG. 3C illustrates the use of the pilot tone to lock the interferometer to a known reference. FIG. 3C also illustrates the generation of feedback signals that can be used to tune transmitted channels $\lambda_1$, $\lambda_2$ and $\lambda_n$ to the desired wavelengths, in this case aligned to the interferometer on ITU grid channels 57, 58, and 59. A 40 GHz FSR interferometer is used to receive, for example, 40 Gbps DPSK data on the 100 GHz ITU grid. As in FIG. 3B, $\lambda_1$ and $\lambda_n$ are at an odd half channel rate spacing multiple being located on an inverted fringe (requiring polarity correction), and $\lambda_2$ is spaced by both integer and half rate multiples of the channel rate. The pilot tone is set to 195,970.0 GHz, and the interferometer phase bias is controlled using a phase shifter (not shown) so that the measured normalized contrast $D(\lambda_p, \Delta\phi)$ for the given pilot tone wavelength is adjusted to a target value, i.e., $D(\lambda_p, \Delta\phi)=T$, where $\{-1\leq T\leq 1\}$.

Continuing to refer to FIG. 3C, the target contrast is zero, which places an inverted fringe precisely on ITU channel #59 (195,900 GHz) where $\lambda_1$ is expected. Similarly, a positive fringe is aligned to ITU channel #58 (195,800 GHz) where $\lambda_2$ is expected, and another inverted fringe is aligned to ITU channel #57 (195,700 GHz) where $\lambda_3$ is expected. Note that the polarity of the ITU channels received by the interferometer could be inverted by simply shifting the pilot tone an odd multiple of FSR/2, (e.g., $\lambda_p$=195,950.0, 195,910.0, or 195,870.0).

Any of the methods known in the prior art, such as proportional feedback control, can be used to control the pilot tone 108. For example, an updated error term can be defined as the difference between the measured value of D and the target T, i.e., $E_{i+1}=D_i-T$. The phase $\Delta\phi$ of the interferometer, controlled by a phase shifter, can be augmented by an increment that is proportional to the error, i.e., $\Delta\phi_{i+1}=\Delta\phi_i+g^*E_i$, where g is an appropriately chosen proportionality constant. The phase of the interferometer 120 may be iteratively updated until the phase error reaches an acceptably small level and converges in a stable manner to a unique phase, at which point, the interferometer 120 is "locked" to the target contrast D and a corresponding phase, $\Delta\phi$.

As indicated in FIG. 3C, the incoming channel wavelengths are measured by wavemeter 170 to be 195,902.2, 195,800.0, and 195,698.2 GHz for $\lambda_1$, $\lambda_2$, and $\lambda_n$, respectively. The control processor 125 calculates the wavelength error for each channel, which corresponds to wavelength error $\Delta$'s of 4.2 GHz, 0.0 GHz, and −1.8 GHz for $\lambda_1$, $\lambda_2$, and $\lambda_n$. The control processor 125 sends accurate wavelength error correction information 188 back to the transmitters 90 to achieve rapid convergence to optimum link performance. Note that error information may be useful for calibrating local wavelengths and measurement hardware, such as the local pilot tone generator 107 or wavemeter 170. For instance, if all the incoming channels yield the same error (e.g., $\Delta_1$ through $\Delta_n$=4.5 GHz), this can be an indicator that either the pilot tone generator 107 or the wavemeter 170 may need calibration. Alternatively, rather than correct all the transmitters with a common wavelength error, the control processor 125 may shift the pilot tone 108 by 4.5 GHz to compensate for the error common to all the transmitters.

To avoid performance penalties when using the multi-channel DPSK receiver 100, the half channel rate and channel spacing can be forced to factor evenly (upholding Equation 2) by either: (i) adjusting the channel spacing to be a multiple of the channel rate, abandoning, for example, a standard such as the ITU grid if necessary, or (ii) adjusting the half channel rate to be an even factor of the channel spacing, abandoning, for example, SONET or G.709 standards, if necessary. Note that applying strong Rate ½ codes to SONET data rates yields channel rates consistent with the multi-wavelength DPSK receiver and standard ITU grid channel spacing.

When misalignment cannot be avoided, e.g., if conforming with existing standards is a priority, performance penalties can be constrained to an acceptable level by operating in a regime where the incoming channel wavelength and the interferometer alignment are close enough so that the misalignment penalty or conformance concerns become negligible.

For instance, a 10.7 Gbps channel rate can be received by a 10.7 GHz FSR interferometer, which can accept optical center frequencies every 5.35 GHz (assuming the ability to anticipate or detect and correct inverted data). While most of the interferometer fringes do not align exactly to the 100

GHz ITU grid, none of the fringes are more than 5.35/2 or ~2.7 GHz from the ITU grid, with the average deviation of ~1.4 GHz. Note that if a smaller deviation is required, the deviation can be reduced by a factor of n by using Non-Adjacent (NA)-DPSK with an n NA-pulse separation, which corresponds to an interferometer FSR narrowed by a factor of n. Thus, for 10.7 Gbps and n=2, transmitted wavelengths can be tuned to align precisely with the interferometer 120, providing penalty-free performance while maintaining a sub-GHz average deviation from the ITU grid. Note that for transmission of harmonically related channel rates (e.g., 2.5 Gbps, 10 Gbps, and 40 Gbps), a single interferometer 120 with delay equal to an integer multiple of the lowest channel rate bit period may also be used to demodulate multi-rate optical signals (e.g., n-NA-DPSK channels with varying n). In this manner, a single interferometer may used to demodulate multiple WDM channels having multiple rates simultaneously. For example, a single interferometer with a 400 psec delay can be used to demodulate multiple optical DPSK signals with ITU grid compliant 100 GHz spaced carrier wavelengths carrying data at 2.5 Gbps, 10 Gbps, and/or 40 Gbps rates.

FIG. 4 is a schematic diagram of a two node network 400 that includes two network nodes 405-1 and 405-2 (collectively, network nodes 405). Each of these network nodes 405 includes transmitter(s) 90 and a receiver 100, as described in reference to FIGS. 1A and 1B. The network nodes 405 communicate via optical paths 410, which may be free space or fiber optic optical paths.

In operation, the transmitter(s) 90 transmits WDM DPSK signal(s) 105 via the optical path 410 to a receiver 100. Proper wavelength spacing is achieved in this embodiment optionally through use of a feedback signal 188, which is fed back by the receiver 100 to the transmitter 90. The feedback signal 188 may be determined through use of the wavemeter 170, which measures the wavelength of each channel (e.g., 1555.000 nm vs. 1554.800 nm). In another embodiment, a reference or pilot tone 108 may be temporarily or continuously introduced into the interferometer 120. The wavelength of the reference or pilot tone 108 may be known in advance or measured with the wavemeter 170. In such an embodiment, the reference or pilot tone 108 can be used for stabilization or to lock the interferometer 120 to a preselected comb of wavelength(s) at which incoming channel(s) are expected to be.

Given knowledge of (i) the pilot tone wavelength, (ii) the interferometer FSR, and (iii) the targeted locking position within the FSR, which are parameters that can be known or measured locally at the receiver 100, the position of the entire comb of interferometer channels (i.e., location of periodic interferometer peaks and troughs) can be determined. This information may be relayed back to the transmitter(s) as target wavelength information or may be combined with measurement of incoming wavelengths to generate an error signal indicating the error between the received and targeted wavelength for each channel.

The error or a representation of the error is fed back to the transmitter(s) 90 of the optical signal(s) for correction of the given channel's wavelength. Optionally, the error signal(s) may be used to align the interferometer 120 to the incoming channels, thereby minimizing the aggregate error. As an example, this capability may be particularly beneficial if all incoming wavelengths deviate from the optimum by the same amount, a condition that can occur whenever the incoming wavelengths are (properly) spaced at an integer multiple of the interferometer FSR. In this case, it may be preferable to tune the interferometer 120 to the incoming signals rather than tuning all the incoming signals to the interferometer 120.

In yet another embodiment, other information available to the receiver may be used to determine the contents of the feedback signal. Examples of such information includes (i) a bit error rate (BER) or other metrics associated with detection of the optical signal(s) 105, such as FEC based error rate estimates or Doppler shift(s) that can be measured, for example, via the wavemeter 170 (optically) or via clock recovery offset(s), or (ii) overhead or data contained in the optical signal(s) 105. In such an embodiment, the transmitter (s) 90 of the optical signal(s) 105 may "step around" the wavelength of the channel(s) until a minimum bit error rate, for example, is found. Other min/max search techniques known in the art may also be employed.

The feedback signals 185, 188 (FIG. 1A) may be implemented in many different forms. For example, the feedback signals 185, 188 may be analog, digital, or packetized. The feedback signals may be communicated via electrical, Radio Frequency (RF), or optical paths using applicable communications techniques and protocols. For example, the feedback signals 185, 188 may be handled via a network-level maintenance and control channel, traffic channel, or other suitable communications channel. The feedback signals 185, 188 may be a command signal or informational signal, depending on the processing capability associated with the transmitter(s) 90. The feedback signals 185, 188 may be included in overhead or payload portions of communications packets. The feedback signals 185, 188 may be transmitted over the optical communications path 410, optical maintenance path (not shown), electrical communications path (not shown), electrical maintenance path (not shown), or other path(s) configured for transporting the feedback signals 185, 188. Since optical transmitter wavelength(s) are generally stable (i.e., have a slow drift rate), correcting the transmitted wavelength(s) can be done relatively infrequently (i.e., every few minutes, hours, days, weeks, months, or years) depending on the transmitter 90 and possibly environmental conditions at the transmitter(s) 90, receiver 100, or optical paths therebetween and be sent from the control processor 125 on a periodic, aperiodic, event driven, or request driven basis.

FIG. 5A is an example communications network 500 in which the receiver 100 may be employed. The communications network 500 is a Free Space Optic (FSO) network. The optical signal 105 is transmitted by the transmitters 90 between mobile platforms, such as communications satellites 501-1 and 501-2, and received by the DPSK receiver(s) 100 in a manner as described above. The optical receiver 100 can also be employed by other platforms, such as aircraft, and relatively stable links, such as building-to-building and ship-to-shore FSO links.

FIG. 5B is another example of a network in which the DPSK receiver 100 may be employed. The optical network 515 includes optical nodes 405-1, 405-2, 405-3, and 405-4 (collectively, nodes 405). Between each of these nodes 405 are fiber optic or FSO communications paths 410. The optical communications network 515 is configured as a Unidirectional Path Switched Ring (UPSR) or Bi-directional Line Switched Ring (BLSR) that may be optically coupled to other rings or optical networks having other configurations.

It should be understood that there are many other optical communications applications in which the WDM receiver 100 may be employed and provide advantages as described above.

While this invention has been particularly shown and described with references to preferred embodiments thereof, it will be understood by those skilled in the art that various changes in form and details may be made therein without departing from the scope of the invention encompassed by the appended claims.

For example, the interferometer 120 of FIG. 1 can be more than a 1-bit delay line interferometer. It may be a multiple bit (multi-bit) delay line interferometer in one embodiment or a dynamically selectable bit delay line interferometer in another embodiment. The pilot tone reference wavelength of FIG. 1A, rather than being local, can be selected as one of the incoming channels. The interferometer 120 and optical channels 105 can align to wavelengths relative to the selected channel through feedback from the control processor 125.

The main optical paths 132 (FIGS. 1A and 1B) may also be a single main optical path instead of the two main optical paths. In such an embodiment, the single main optical path may carry a signal when the interference is constructive and no signal when the interference is destructive, or vice-versa. Because the two main optical path embodiment provides 3 dB more sensitivity than the single main optical path embodiment, the two main optical path embodiment is generally preferable. However, the single main path embodiment may be easier to implement since it does not require both a-side and b-side elements (such as WDMs 131), balanced detection, or amplitude and time alignment of received photocurrents for each channel.

The main optical paths 132 may also include more than two main optical paths. Such an embodiment may be used in cases where the interferometer interferes more than two optical signal pulses in the DPSK channels. For example, future noise reduction or security schemes may facilitate or warrant higher order DPSK demodulation, in which case, three, four, or more main optical paths 132 may be employed.

In FIGS. 1A and 1B, instead of having a tributary optical path for each wavelength, multiple wavelengths may be directed onto the same tributary optical paths and separated onto yet other tributary optical paths to respective optical receivers for processing.

In addition to use in the point-to-point network of FIG. 5A and the ring network of FIG. 5B, the receiver 100 may be used in other network configurations, such as mesh networks, Bi-directional Line Switched Ring (BLSR) networks, broadcast networks, or multi-access networks.

What is claimed is:

1. An apparatus for demodulating an optical signal having Differentially Encoded Phase Shift Keying (DPSK) channels, the apparatus comprising:
    a delay line interferometer to (i) delay at least one channel in an optical signal by multiple bits, (ii) demodulate the optical signal from having DPSK channels to an optical signal having channels modulated in intensity and (iii) output the demodulated optical signal onto at least one main output optical path; and
    channel selectors in the at least one main output optical path to direct channels onto tributary optical paths.

2. The apparatus according to claim 1 further including optoelectronic converters in the tributary optical paths to convert the demodulated optical signal into respective, corresponding, electrical signals.

3. The apparatus according to claim 1 wherein the delay line interferometer delays at least one channel by at least one bit.

4. The apparatus according to claim 1 wherein the delay line interferometer is selectably adjustable to interfere optical signal pulses offset by a selectable number.

5. The apparatus according to claim 1 wherein the interferometer includes an electronically tunable phase shifter to receive incoming wavelengths.

6. The apparatus according to claim 1 wherein wavelength spacing between carrier wavelengths defining the channels is an integer multiple of a channel rate of the optical signal.

7. The apparatus according to claim 1 wherein wavelength spacing between carrier wavelengths defining the channels is evenly divisible by an odd number of half channel rates of the optical signal.

8. The apparatus according to claim 7 further including a polarity corrector to correct polarity of the channels.

9. The apparatus according to claim 8 wherein the polarity corrector is configured to correct polarity of electrical signals corresponding to the channels.

10. The apparatus according to claim 8 wherein the polarity corrector is configured to optically correct polarity of the channels.

11. The apparatus according to claim 1 wherein channel rates are integer multiples of interferometer delay.

12. The apparatus according to claim 1 further including a feedback processor to generate signal(s) transmitted to a transmitter(s) of the optical signal(s) to cause the transmitter to tune carrier wavelengths defining the channels for adjusting wavelength position or channel separation.

13. The apparatus according to claim 1 further including a low noise optical amplifier to receive the optical signal and outputting the received amplified optical signal to the interferometer.

14. The apparatus according to claim 1 wherein the channel selectors include optical filters.

15. The apparatus according to claim 1 wherein the interferometer is configured to receive at least one pilot signal to allow for stabilization and control of the interferometer and wavelength alignment of the incoming optical signal(s).

16. The apparatus according to claim 1 used in an optical regenerator.

17. The apparatus according to claim 1 used in a free space optic communications network.

18. The apparatus according to claim 1 used in a fiber optic communications network.

19. A method of demodulating an optical signal having Differentially Encoded Phase Shift Keying (DPSK) channels, the method comprising:
    delaying first optical signal pulses in at least one DPSK channel of the optical signal by a multiple bit duration to align the first optical signal pulses with second differentially encoded optical signal pulses also in the at least one DPSK channel;
    interfering the first and the second optical signal pulses in an aligned state to demodulate the optical signal from having DPSK channels to an optical signal having channels modulated in intensity;
    outputting the demodulated optical signal onto at least one main output optical path; and
    directing channels in the at least one main output optical path onto tributary optical paths.

20. The method according to claim 19 further including converting the demodulated optical signal on the tributary optical paths into respective, corresponding, electrical signals.

21. The method according to claim 19 wherein demodulating the optical signal includes interfering adjacent optical signal pulses.

22. The method according to claim 19 wherein demodulating the optical signal includes interfering non-adjacent optical signal pulses.

23. The method according to claim 19 wherein demodulating the optical signal includes interfering optical signal pulses offset by a selectable number.

24. The method according to claim 19 wherein demodulating the optical signal includes tuning an interferometer for receiving incoming wavelengths.

25. The method according to claim 19 wherein wavelength spacing between carrier wavelengths defining the channels is an integer multiple of a channel rate of the optical signal.

26. The method according to claim 19 wherein wavelength spacing between carrier wavelengths defining the channels is evenly divisible by an odd number of half channel rates of the optical signal.

27. The method according to claim 26 further including correcting polarity of the channels.

28. The method according to claim 27 wherein correcting the polarity of the channels includes correcting polarity of electrical signals corresponding to the channels.

29. The method according to claim 27 wherein correcting the polarity of the channels includes optically correcting polarity of the channels.

30. The method according to claim 19 wherein channel rate bit durations are integer multiples of demodulating delay.

31. The method according to claim 19 further including feeding back signal(s) to transmitter(s) of the optical signal (s) to cause the transmitter to tune carrier wavelengths defining the channels for adjusting wavelength position or channel separation.

32. The method according to claim 19 further including optically amplifying the optical signal prior to demodulating the optical signal.

33. The method according to claim 19 wherein directing the channels onto the tributary optical paths includes filtering the phase demodulated optical signal.

34. The method according to claim 19 further including controlling the demodulating interferometer based on at least one pilot signal.

35. The method according to claim 19 used in an optical regenerator.

36. The method according to claim 19 used in a free space optic communications network.

37. The method according to claim 19 used in a fiber optic communications network.

38. An apparatus for demodulating an optical signal having Differentially Encoded Phase Shift Keying (DPSK) channels, the apparatus comprising:
    means for delaying first optical signal pulses in the at least one DPSK channel of the optical signal by a multiple bit duration to align the first optical pulses with differentially encoded second optical signal pulses also in the at least one DPSK channel;
    means for interfering the first and second differentially encoded optical signal pulses in an aligned state to demodulate the optical signal from having DPSK channels to an optical signal having channels modulated in intensity;
    means for outputting the demodulated optical signal onto at least one main output optical path; and
    means for directing channels in the at least one main output optical path onto tributary optical paths.

39. The apparatus according to claim 38 wherein wavelength spacing between carrier wavelengths defining the channels is an integer multiple of a channel rate of the optical signal.

40. The apparatus according to claim 38 wherein wavelength spacing between carrier wavelengths defining the channels is evenly divisible by an odd number of half channel rates of the optical signals.

41. The apparatus according to claim 40 further including means for correcting polarity of the channels.

42. The apparatus according to claim 38 wherein channel rates are integer multiples of interferometer delay.

43. A method for demodulating an optical signal having Differentially Encoded Phase Shift Keying (DPSK) channels, the method comprising:
    feeding back a signal to constrain wavelength spacing of DPSK channels in an optical signal; and
    interfering offset optical signal pulses in the optical signal to demodulate the optical signal from being DPSK modulated to being intensity modulated.

44. The method according to claim 43 further including directing channels in the demodulated optical signal from at least one main optical path onto tributary optical paths.

45. A system for demodulating an optical signal having Differentially Encoded Phase Shift Keying (DPSK) channels, the system comprising:
    means for feeding back a signal to constrain wavelength spacing of DPSK channels in an optical signal; and
    means for interfering offset optical signal pulses in the optical signal to demodulate the optical signal from being DPSK modulated to being intensity modulated.

46. The system according to claim 45 further including means for directing channels in the demodulated optical signal from at least one main optical path onto tributary optical paths.

47. An apparatus for demodulating an optical signal having Differentially Encoded Phase Shift Keying (DPSK) channels, the apparatus comprising:
    a processor to feed back a signal to constrain wavelength spacing of DPSK channels in an optical signal; and
    an interferometer that interferes offset optical signal pulses in the optical signal to demodulate the optical signal from being DPSK modulated to being intensity modulated.

48. The apparatus according to claim 47 wherein the interferometer directs channels in the demodulated optical signal from at least one main optical path onto tributary optical paths.

49. An apparatus for demodulating an optical signal having Differentially Encoded Phase Shift Keying (DPSK) channels, the apparatus comprising:
    a delay line interferometer to (i) demodulate an optical signal from having DPSK channels to an optical signal having channels modulated in intensity (ii) output the demodulated optical signal onto at least one main output optical path, and (iii) receive at least one pilot signal to allow for stabilization and control of the interferometer and wavelength alignment of the incoming optical signal(s); and
    channel selectors in the at least one main output path to direct channels onto tributary optical paths.

* * * * *

UNITED STATES PATENT AND TRADEMARK OFFICE
CERTIFICATE OF CORRECTION

PATENT NO. : 7,233,430 B2  Page 1 of 1
APPLICATION NO. : 11/022344
DATED : June 19, 2007
INVENTOR(S) : David O. Caplan It is certified that error appears in the above-identified patent and that said Letters Patent is hereby corrected as shown below:

<u>Column 13</u>
Claim 31, line 33, delete "signal" and insert -- signal(s) -- ,
Claim 31, line 34, delete "(s)".

Claim 38, line 57, insert -- signal -- between "optical" and "pulses".

Signed and Sealed this

Eighteenth Day of September, 2007

JON W. DUDAS
*Director of the United States Patent and Trademark Office*